United States Patent
Huang et al.

(10) Patent No.: US 10,116,101 B2
(45) Date of Patent: Oct. 30, 2018

(54) CABLE CONNECTOR ASSEMBLY HAVING A THERMISTOR AFFIXED TO A PROTECTIVE COVER AND METHOD OF MAKING THE CABLE CONNECTOR ASSEMBLY

(71) Applicant: FOXCONN INTERCONNECT TECHNOLOGY LIMITED, Grand Cayman (KY)

(72) Inventors: Chien-Hsun Huang, New Taipei (TW); Xiao-Li Li, Kunshan (CN); Dou-Feng Wu, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/860,645

(22) Filed: Jan. 2, 2018

(65) Prior Publication Data
US 2018/0191107 A1 Jul. 5, 2018

(30) Foreign Application Priority Data
Dec. 30, 2016 (CN) .......................... 2016 1 1262597

(51) Int. Cl.
*H01R 13/502* (2006.01)
*H01R 13/66* (2006.01)
(Continued)

(52) U.S. Cl.
CPC ..... *H01R 13/6608* (2013.01); *H01R 13/5845* (2013.01); *H01R 13/6581* (2013.01)

(58) Field of Classification Search
CPC .. H01R 13/514; H01R 13/5804; H01R 13/20; H01R 4/2433; H01R 13/59; H01R 13/6215
(Continued)

(56) References Cited

U.S. PATENT DOCUMENTS 6,887,098 B1 * 5/2005 Luo ...................... H01R 13/518
439/540.1
7,689,089 B2 * 3/2010 Wagner .................... H04Q 1/13
385/135
(Continued)

FOREIGN PATENT DOCUMENTS

CN  202632919 U  12/2012
CN  203491732 U  3/2014
(Continued)

*Primary Examiner* — Phuong Chi T Nguyen
(74) *Attorney, Agent, or Firm* — Wei Te Chung; Ming Chieh Chang

(57) ABSTRACT

A cable connector assembly includes: a mating unit; a cable; a printed circuit board (PCB) interconnected between the mating unit and the cable; a protective cover and a thermistor affixed to the protective cover, the protective cover and the thermistor being mounted on the PCB; a metal shell enclosing the PCB, a rear of the mating unit, and a front of the cable; an insulative inner cover over-molding the PCB, the metal shell, the rear of the mating unit, and the front of the cable; and an insulative outer cover over-molding the insulative inner cover. A method of making the cable connector assembly includes affixing the thermistor to the protective cover and mounting the protective cover and the thermistor on the PCB.

14 Claims, 15 Drawing Sheets

(51) Int. Cl.
*H01R 13/58* (2006.01)
*H01R 13/6581* (2011.01)

(58) Field of Classification Search
USPC ............... 439/701, 471, 271, 402, 462, 353
See application file for complete search history.

(56) References Cited

U.S. PATENT DOCUMENTS

| | | | |
|---|---|---|---|
| 8,882,545 B2* | 11/2014 | Vroom | H01R 13/512 |
| | | | 439/639 |
| 2011/0268152 A1* | 11/2011 | Becker | G01K 7/023 |
| | | | 374/179 |
| 2016/0197500 A1 | 7/2016 | Liang | |

FOREIGN PATENT DOCUMENTS

| | | |
|---|---|---|
| CN | 205960251 U | 2/2017 |
| TW | 201717504 A | 5/2017 |

* cited by examiner

CABLE CONNECTOR ASSEMBLY HAVING A THERMISTOR AFFIXED TO A PROTECTIVE COVER AND METHOD OF MAKING THE CABLE CONNECTOR ASSEMBLY

BACKGROUND OF THE INVENTION

1. Field of the Invention

The present invention relates to a cable connector assembly having an internal printed circuit board carrying a protective cover and a thermistor enclosed by and affixed to the protective cover and a method of making the cable connector assembly.

2. Description of Related Arts

U.S. Patent Application Publication No. 2016/0197500, published on Jul. 7, 2016, discloses a mobile terminal charger comprising a thermistor and a charger output protection circuit. Specifically shown is a cable connector assembly comprising: a mating unit; a cable; a printed circuit board (PCB) interconnected between the mating unit and the cable, the PCB carrying a thermistor; a metal shell enclosing the PCB, a rear of the mating unit, and a front of the cable; an insulative inner mold; and an insulative outer mold. The thermistor may adopt a positive temperature coefficient (PTC) resistor in series with another resistor in the charger.

China Patent No. 202632919, issued on Dec. 26, 2012, discloses a precision thermistor mounted on a PCB, comprising a resistor, a heat-conducting plate spaced from the resistor, and a packing cover. The resistor includes a heat-sensing part and a pair of electrodes. The packing cover encloses the heat-sensing part of the resistor and respective parts of the heat-conducting plate and the electrodes.

SUMMARY OF THE INVENTION

A cable connector assembly comprises: a mating unit; a cable; a printed circuit board (PCB) interconnected between the mating unit and the cable; a protective cover and a thermistor affixed to the protective cover, the protective cover and the thermistor being mounted on the PCB; a metal shell enclosing the PCB, a rear of the mating unit, and a front of the cable; an insulative inner cover over-molding the PCB, the metal shell, the rear of the mating unit, and the front of the cable; and an insulative outer cover over-molding the insulative inner cover. A method of making the cable connector assembly comprises affixing the thermistor to the protective cover and mounting the protective cover and the thermistor on the PCB.

DETAILED DESCRIPTION OF THE PREFERRED EMBODIMENTS

Figure 1:
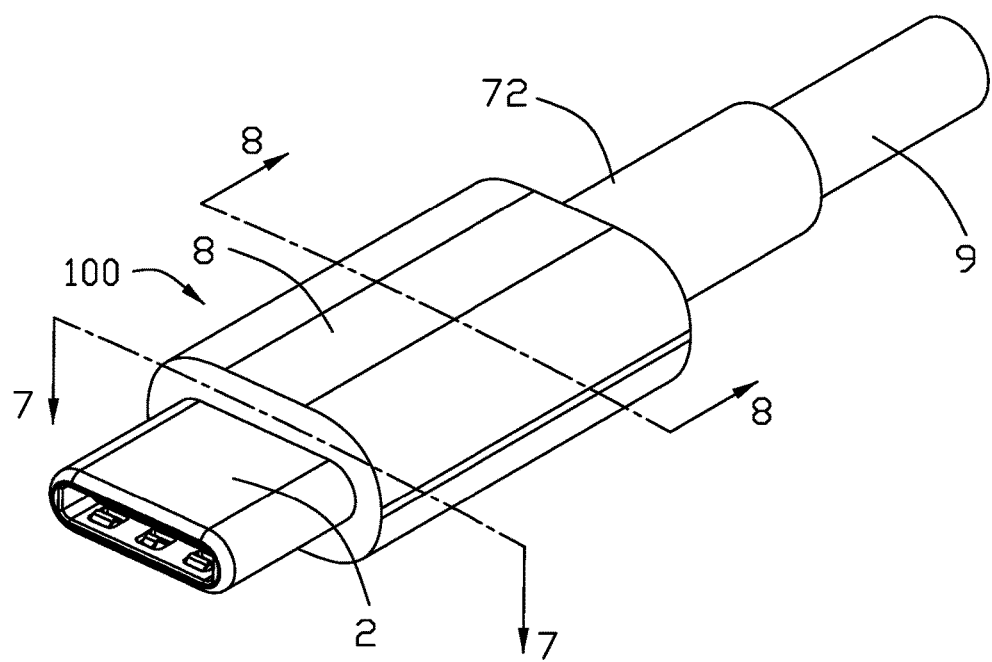
FIG. 1 is a perspective view of a cable connector assembly in accordance with a first embodiment of the present invention.
Figure 2:
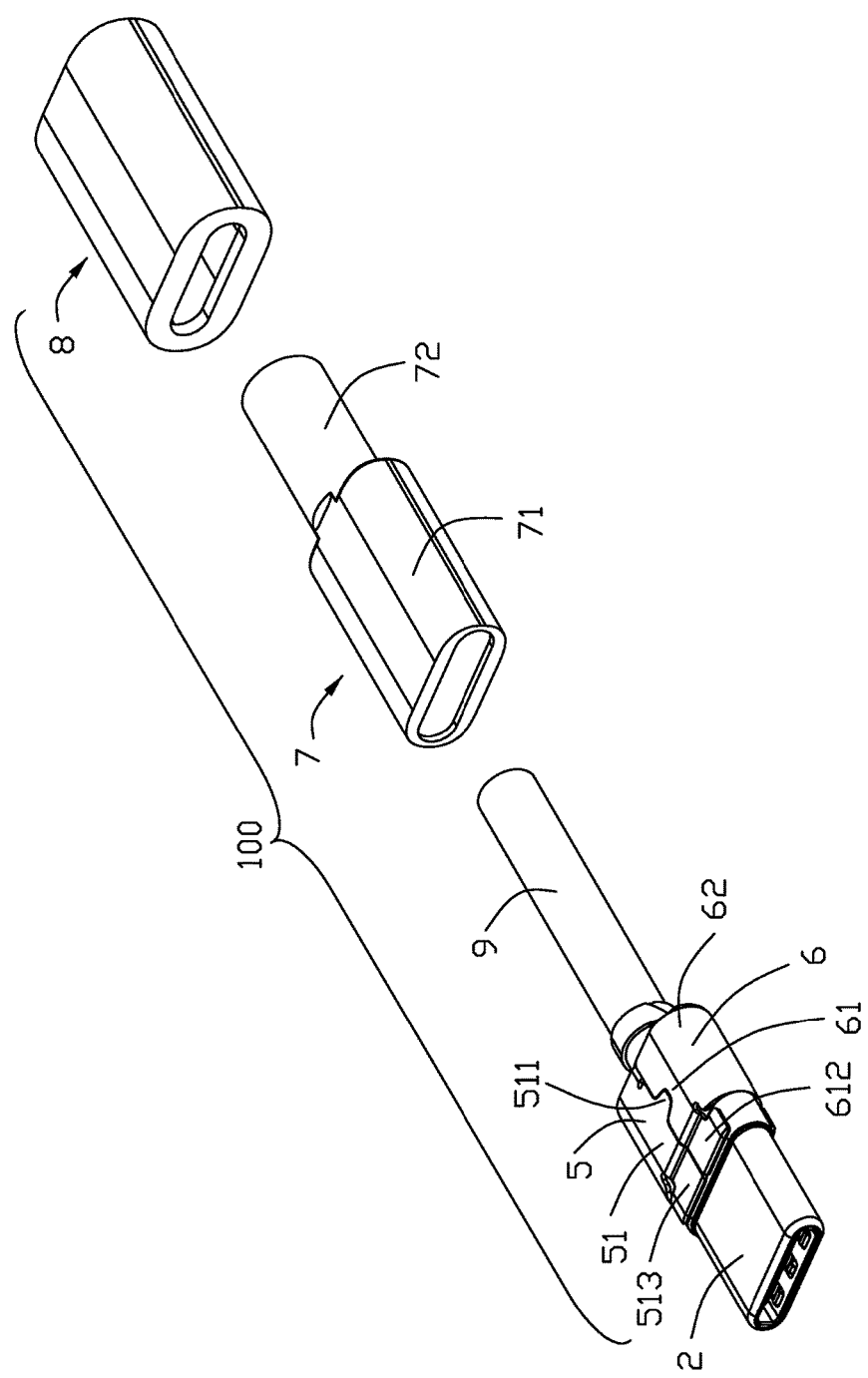
FIG. 2 is a partly exploded view of the cable connector assembly.
Figure 3:
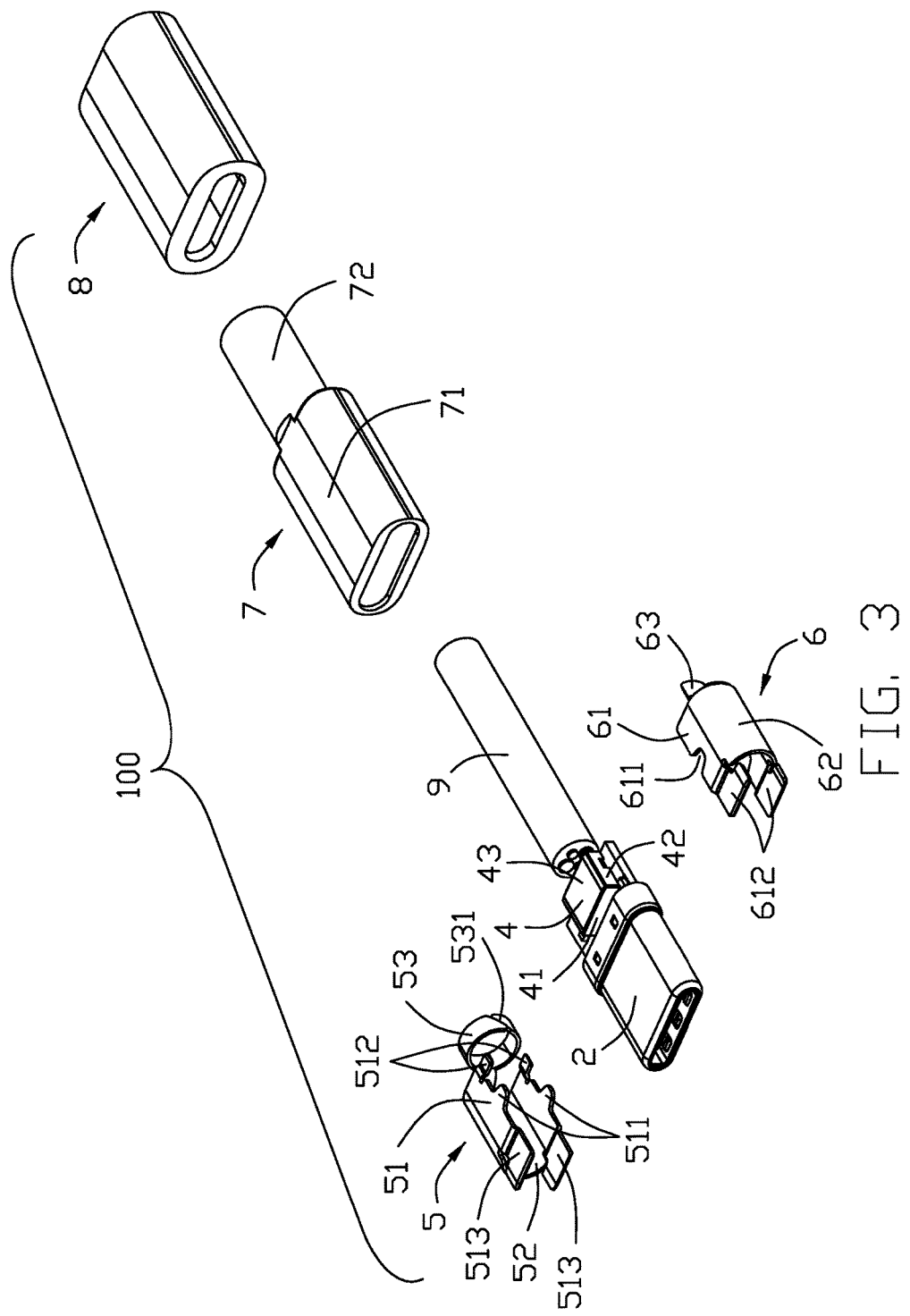
FIG. 3 is a further exploded view of the cable connector assembly.
Figure 4:
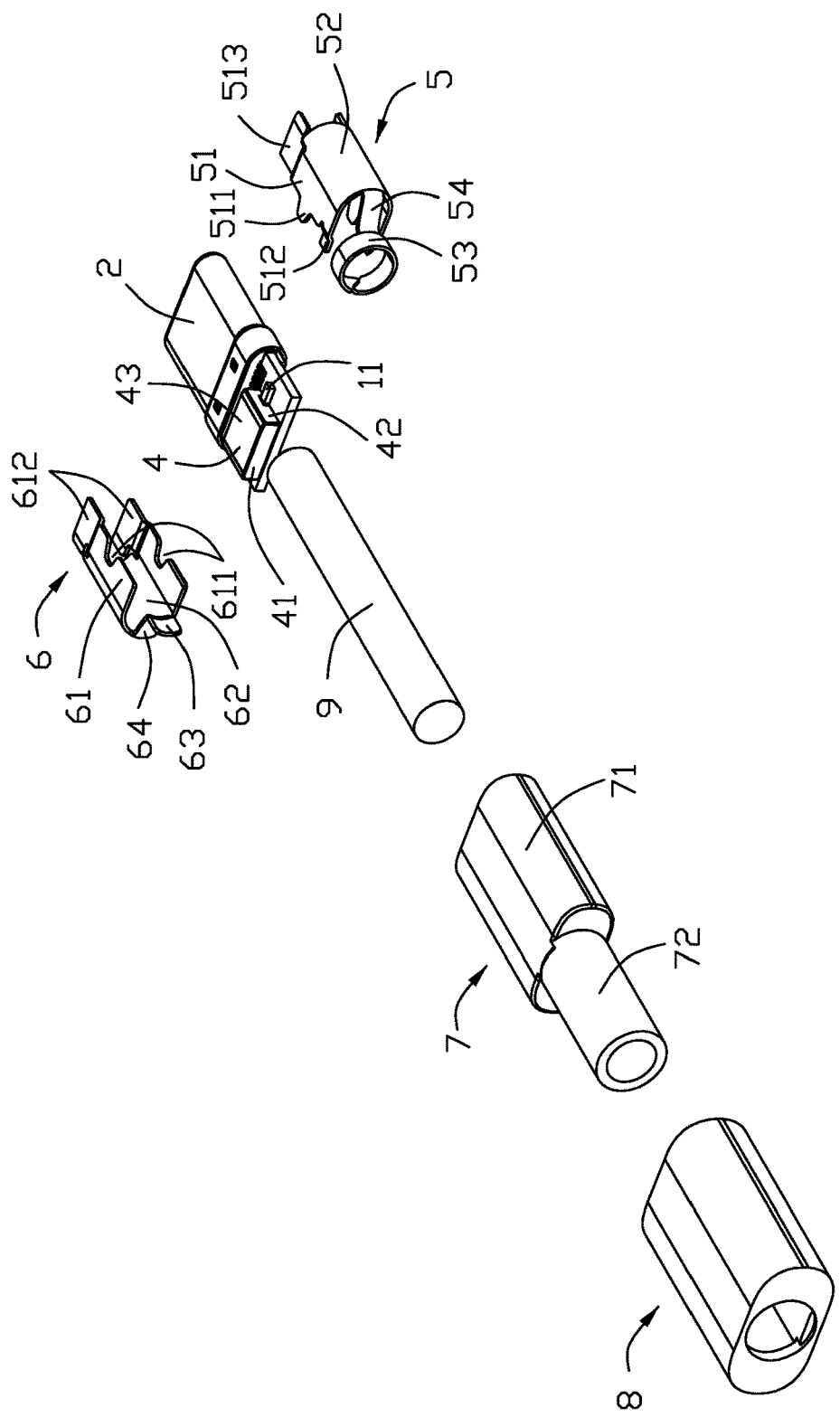
FIG. 4 is a view similar to FIG. 3 but from a different perspective.
Figure 5:
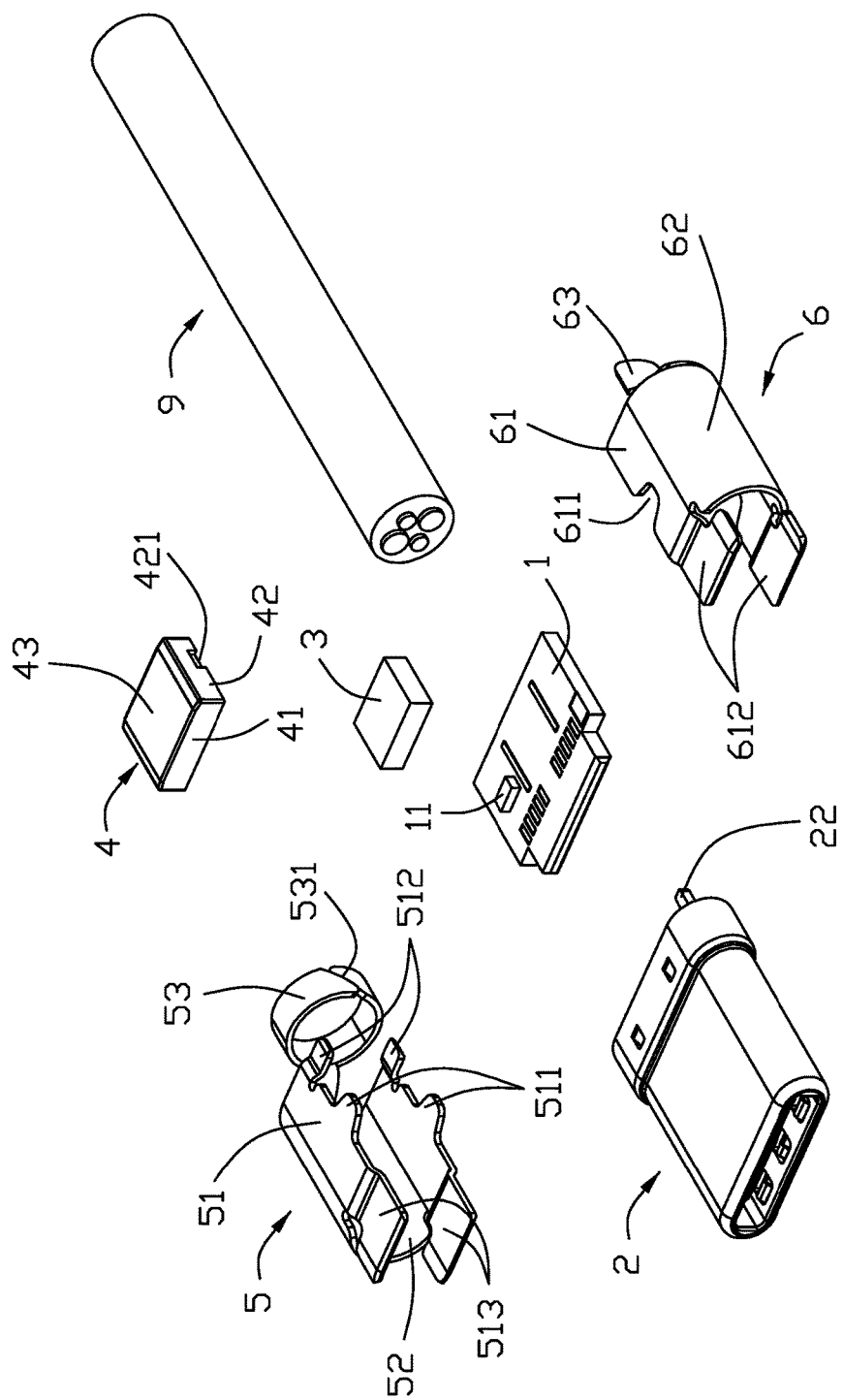
FIG. 5 is a still further exploded view of the cable connector assembly in FIG. 3 omitting an inner and outer covers thereof.
Figure 6:
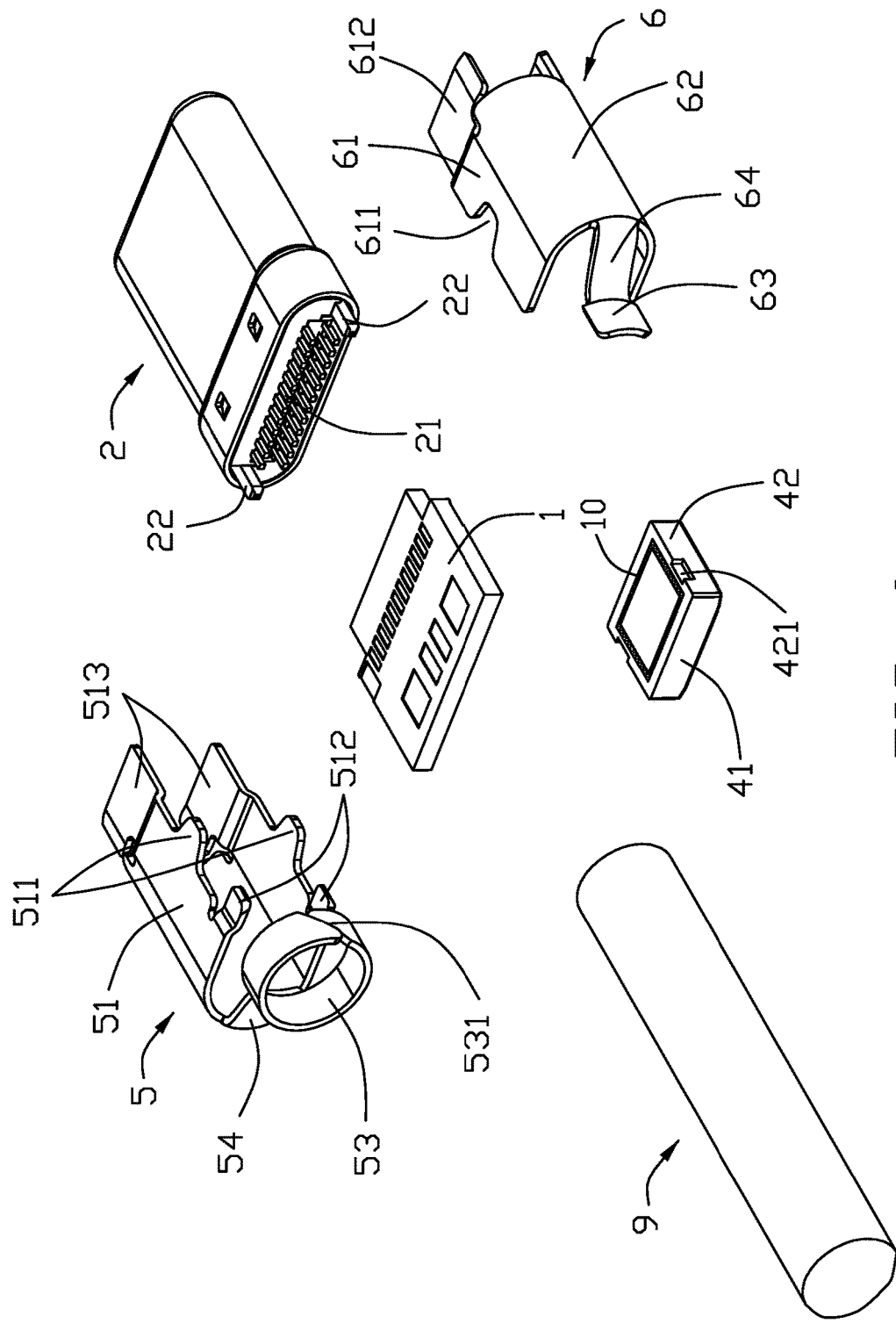
FIG. 6 is a view similar to FIG. 5 but from a different perspective.
Figure 7:
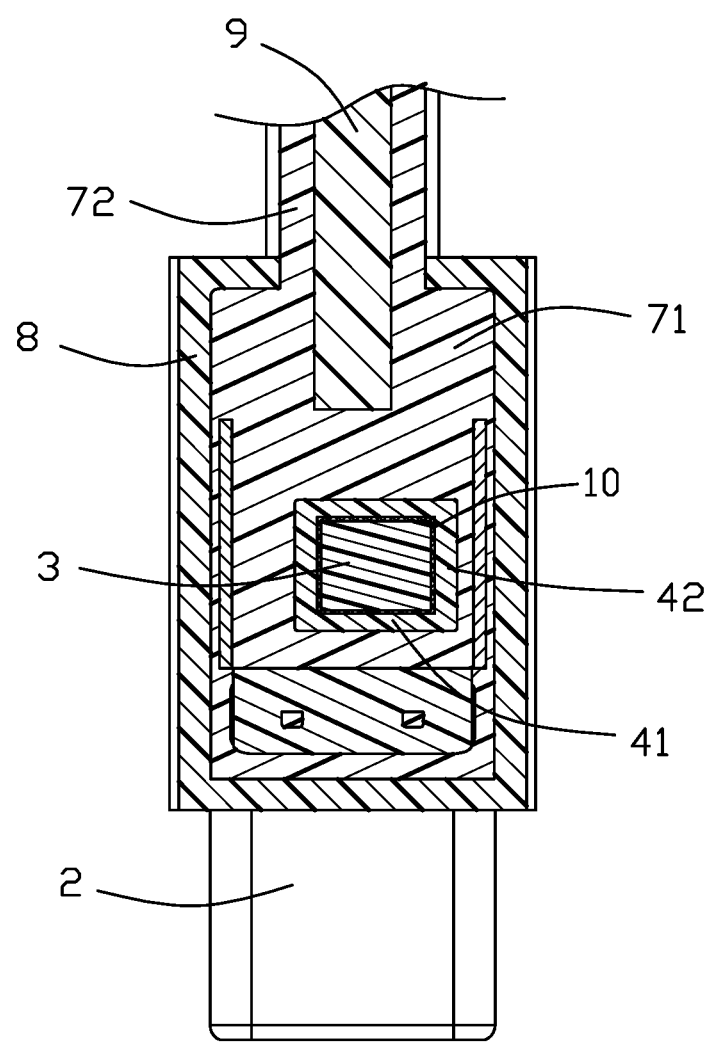
FIG. 7 is a cross-sectional view of the cable connector assembly in FIG. 1 taken along line A-A.
Figure 8:
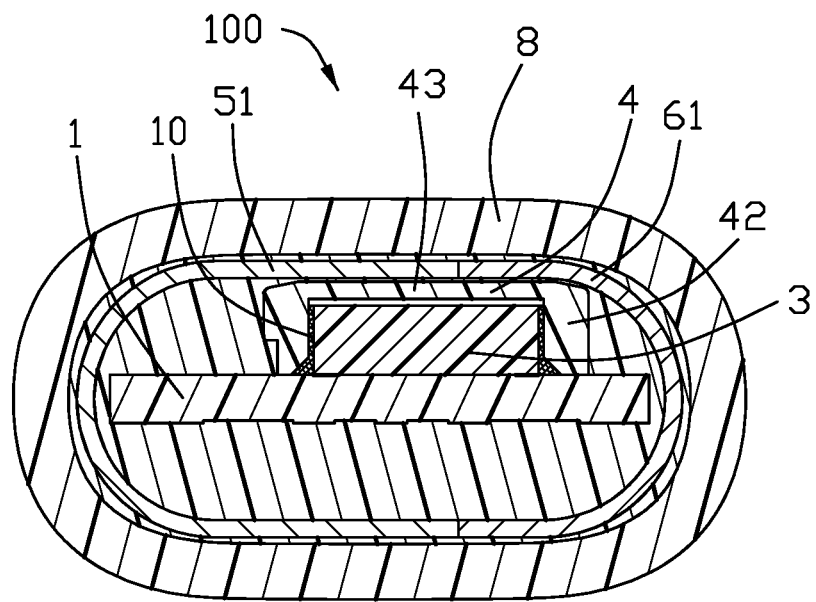
FIG. 8 is a cross-sectional view of the cable connector assembly in FIG. 1 taken along line B-B.
Figure 9:
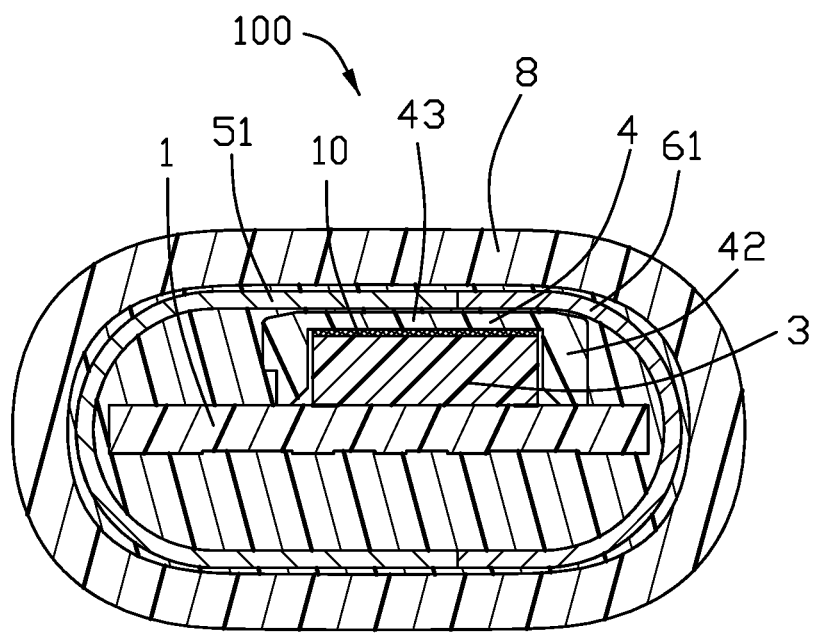
FIG. 9 is a view similar to FIG. 8 but showing a varied design.

Referring to FIGS. 1-9, a cable connector assembly 100 comprises: a mating unit 2; a cable 9; a printed circuit board (PCB) 1 interconnected between the mating unit and the cable; a protective cover 4 and an over-current protection element 3 mounted on the PCB 1; a metal shell enclosing the PCB 1, a rear of the mating unit 2, and a front of the cable 9; an insulative inner cover 7 over-molding the PCB 1, the metal shell, the rear of the mating unit 2, and the front of the cable 9; and an insulative outer cover 8 over-molding the inner cover 7.

Referring specifically to FIGS. 3-6, on the PCB 1 is soldered a capacitor 11. The over-current protection element 3 is a thermistor, e.g., Positive Temperature Coefficient or PTC type. With PTC thermistors, resistance increases as temperature rises. PTC thermistors are commonly installed in series with a circuit, and used to protect against overcurrent conditions. The thermistor 3 may expand under increased temperatures. The mating unit 2 or plug connector is of a reverse-symmetrical type capable of mating in two orientations. The mating unit 2 or plug connector includes two rows of rear soldering tails 21 and a pair of securing legs 22.

The protective cover 4 includes a fence and a top wall 43. The cover 4 may be rectangular or cylindrical. The fence has a pair of first side walls 41 and a pair of second side walls 42, which together with the top wall 43, enclose a receiving space. Each of the pair of second side walls 42 has an opening 421. A lateral dimension of the first side wall 41 is greater than a left-and-right width of the thermistor 3 and a longitudinal dimension of the second side wall 41 is greater than a front-and-back length of the thermistor 3. The first and second side walls 41 and 42 are each taller than a height of the thermistor 3.

The metal shell includes a first shell part 5 and a second shell part 6. The first shell part 5 includes an upper and lower main portions 51 having features like arms or legs 511, 512, and 513, a side portion 52 between the two main portions, a fastening portion 53 having a feature 531, and a linking portion 54. The second shell part 6 is similarly designed to include main portions 61 having features 611 and 612, a curved side portion 62, a fastening portion 63, and a linking portion 64.

The insulative inner cover 7 has a first covering portion 71 and a second covering portion 72. The insulative outer cover 8 is tubular.

The cable connector assembly 100 is manufactured in a generally known way as to the mating unit 2, the cable 9, interconnecting the PCB 1 between the mating unit 2 and the cable 9, enclosing the metal shell, and over-molding the insulative inner and outer covers. As for affixing the thermistor 3 to the protective cover 4 and mounting the affixed protective cover 4 and thermistor 3 on the PCB 1, it is generally straightforward except for otherwise indicated. Basically, the inner surface of the cover fence is so coated with an elastic body 10 that the thermistor 3 is adhered to the protective cover 4, thereby permitting any expansion of the thermistor 3. Or the inner surface of the cover top wall 43 rather than the fence is coated with the elastic body 10 to obtain the same effect. Or both inner surfaces of the cover top wall 43 and fence are coated. Such latitude in expansion is not provided if the thermistor 3 is buried by or embedded in the insulative inner cover 7. Notably, a chamfered structure (not labeled) is formed on the fence around the printed circuit board for accommodating the elastic body 10.

The openings 421 on the pair of second side walls 42 in cooperation with the capacitor 11 enable a time-saving assembling operation during mounting the protective cover 4 to the PCB 1. The insulative outer cover 8 reinforces the insulative inner cover 7.

Figure 10:
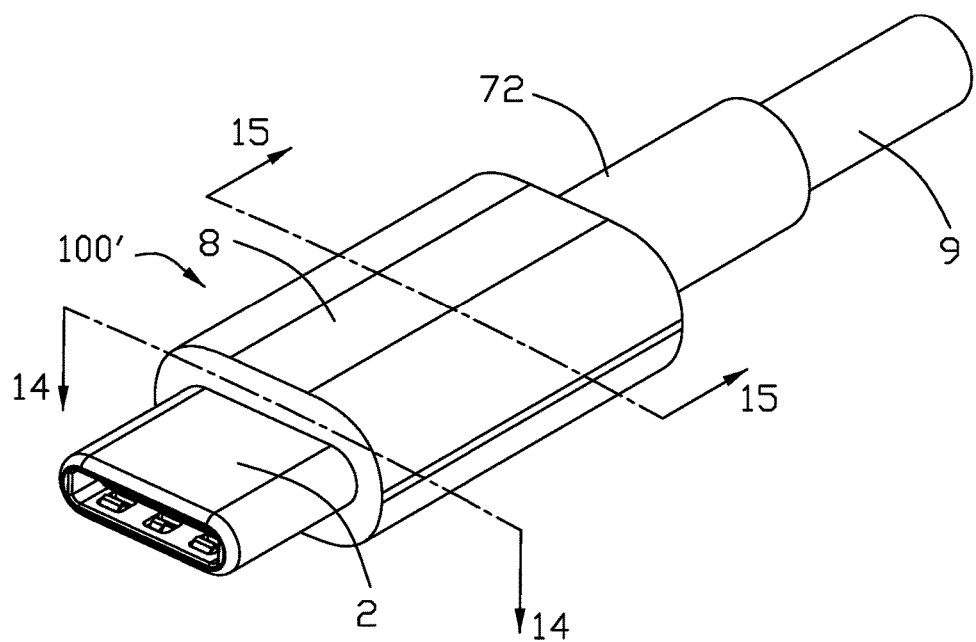
FIG. 10 is a perspective view of a cable connector assembly in accordance with a second embodiment of the present invention.
Figure 11:
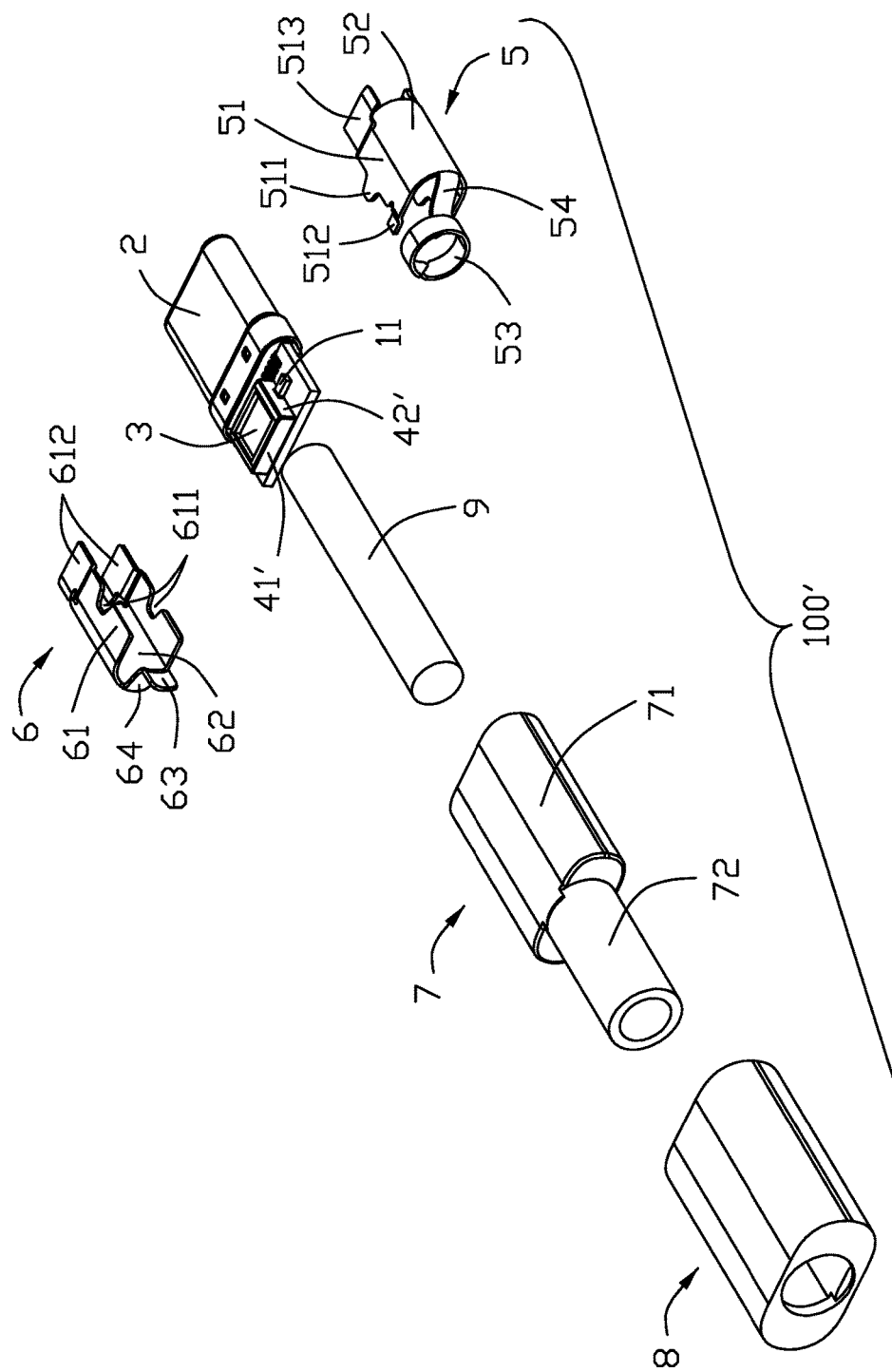
FIG. 11 is a partly exploded view of the cable connector assembly in FIG. 10.
Figure 12:
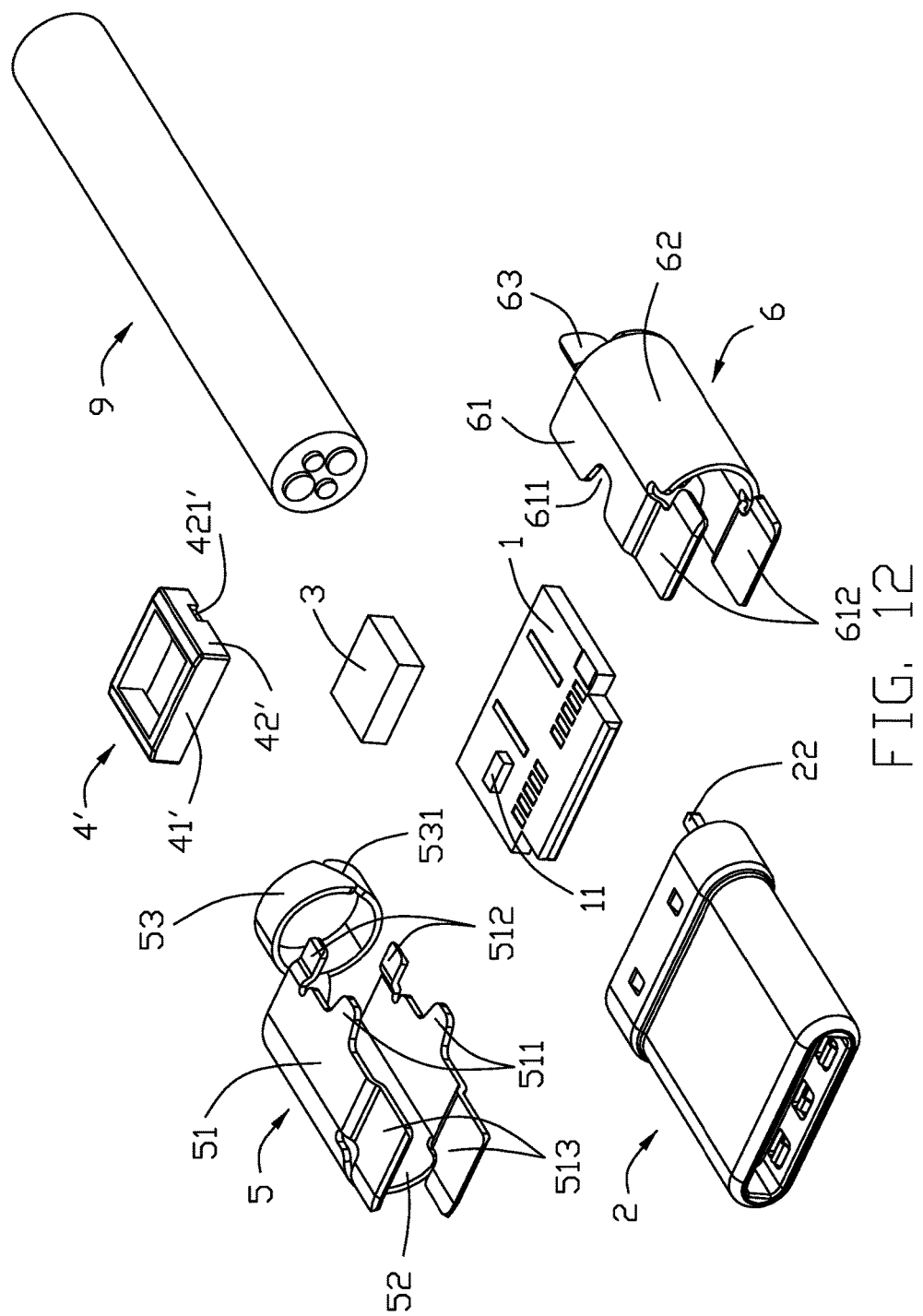
FIG. 12 is a further exploded view of the cable connector assembly in FIG. 11 omitting an inner and outer covers thereof.
Figure 13:
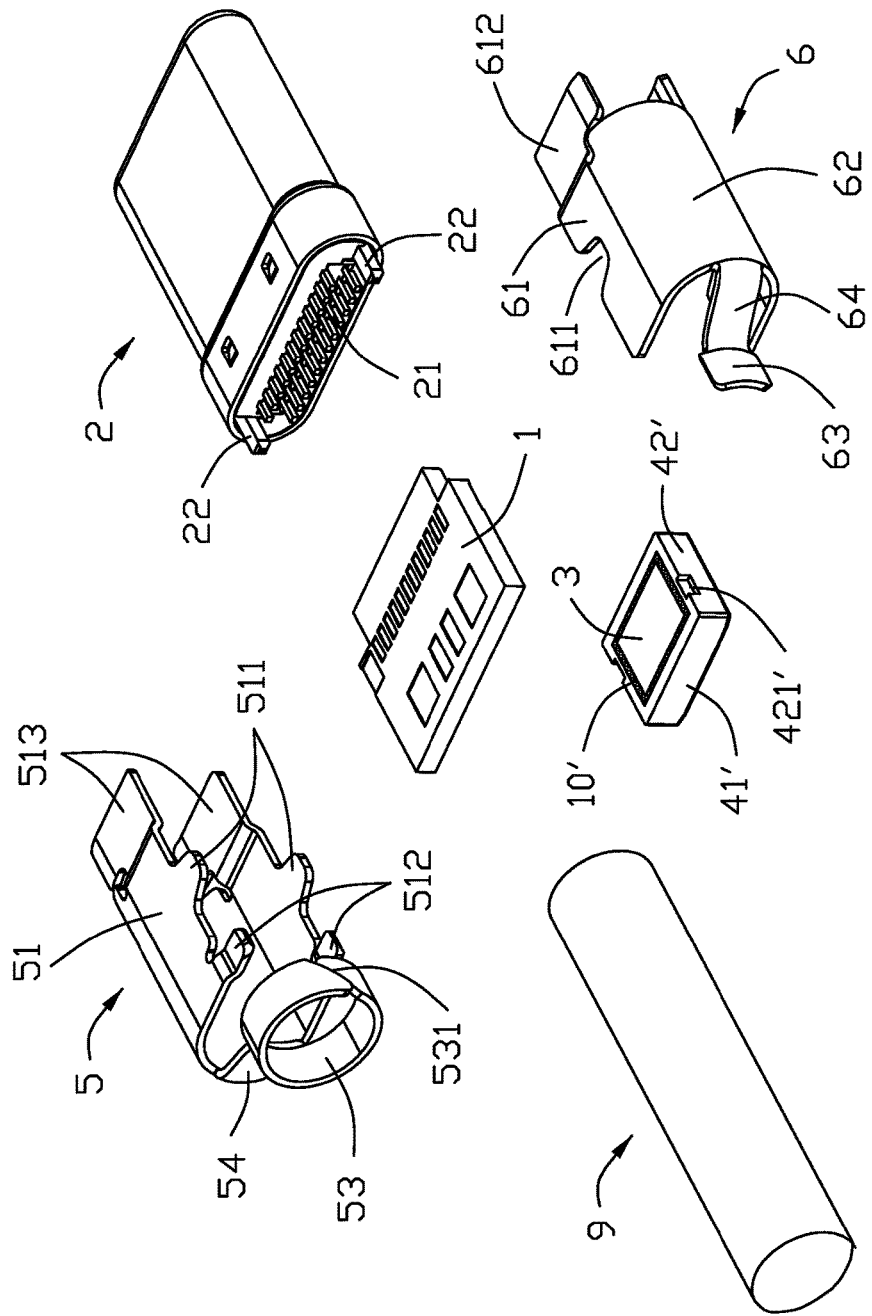
FIG. 13 is a view similar to FIG. 12 but from a different perspective.
Figure 14:
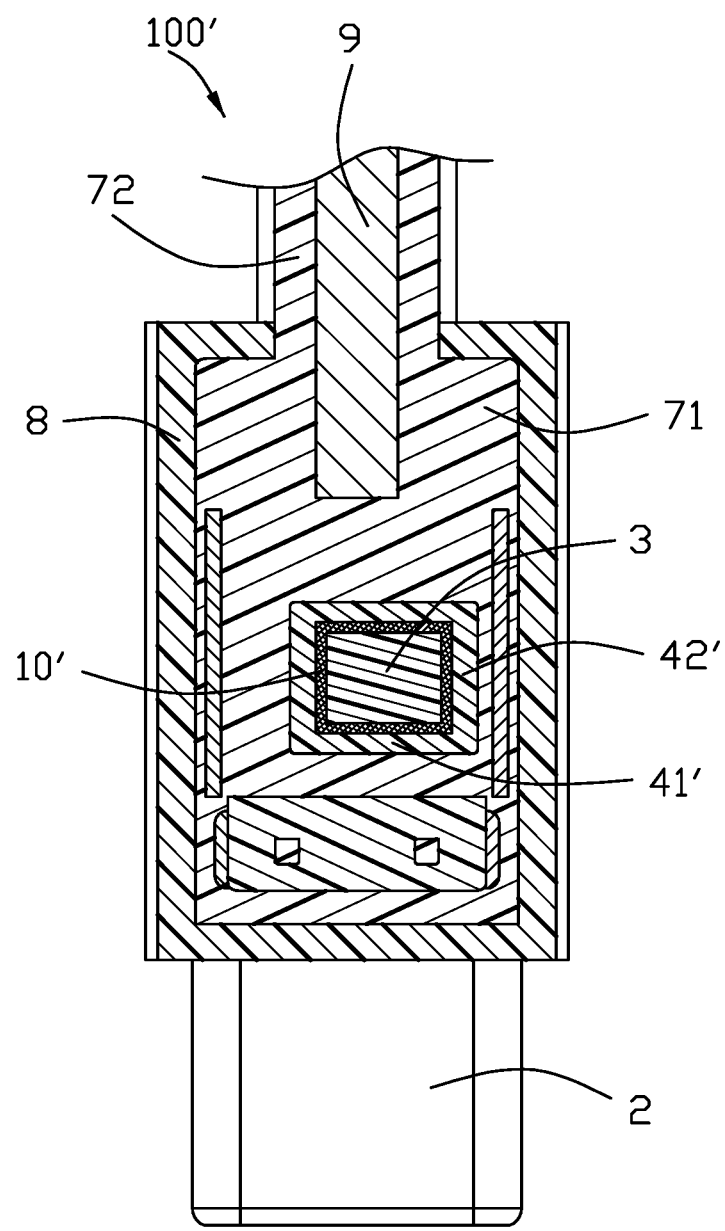
FIG. 14 is a cross-sectional view of the cable connector assembly in FIG. 10 taken along line C-C.
Figure 15:
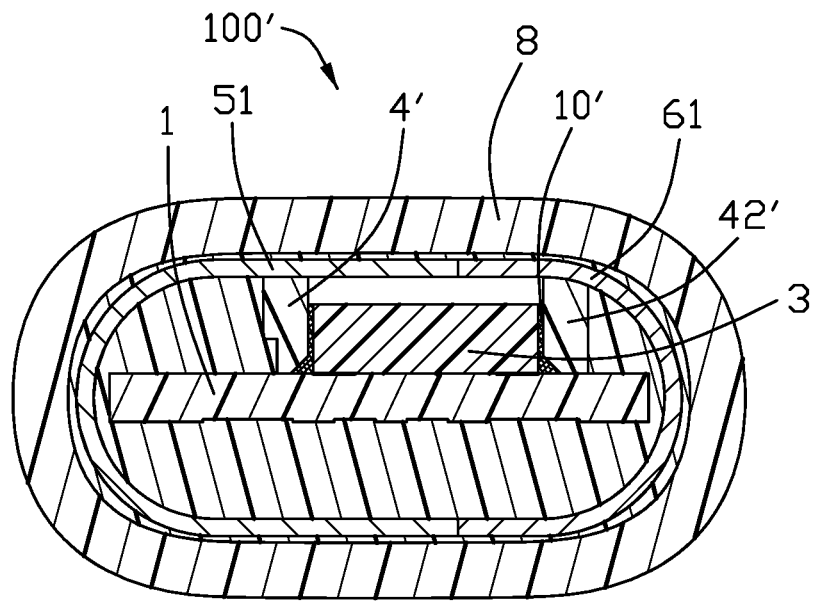
FIG. 15 is a cross-sectional view of the cable connector assembly in FIG. 10 taken along line D-D.

Referring to FIGS. 10-15, a cable connector assembly 100' of the second embodiment is different from the first embodiment only in the design of a protective cover 4' which has a fence consisted of a pair of first side walls 41' and a pair of second side walls 42' but does not have a top wall. Each of the pair of second side walls 42 has an opening 421. Specifically, the thermistor 3 is also affixed in the receiving space of the protective cover 4' through an elastic body 10' so as to accommodating any expansion of the thermistor 3. Absence of a top wall in the protective cover 4' is alleviated by close arrangement of the fence thereof to the upper main portions 51 and 61 of the first and second shell parts 5 and 6. The method of making the cable connector assembly 100' is same as the method of making the cable connector assembly 100 of the first embodiment.

What is claimed is:

1. A cable connector assembly comprising:
    a mating unit;
    a cable;
    a printed circuit board (PCB) interconnected between the mating unit and the cable;
    a protective cover and a thermistor affixed to the protective cover, the protective cover and the thermistor being mounted on the PCB;
    a metal shell enclosing the PCB, a rear of the mating unit, and a front of the cable;
    an insulative inner cover over-molding the PCB, the metal shell, the rear of the mating unit, and the front of the cable; and
    an insulative outer cover over-molding the insulative inner cover; wherein
    the thermistor is installed in series with a circuit and used to protect against overcurrent conditions; the thermistor is adhered to the protective cover, thereby permitting any expansion of the thermistor; wherein
    the metal shell includes a first shell part and a second shell part fastened together; the first shell part and the second shell parts include main portions having extended arms to wrap around the mating unit, side portions cooperating with the main portions to surround the PCB, and linking portions extending from the corresponding side portions or main portions to fastening portions crimping the cable.

2. The cable connector assembly as claimed in claim 1, wherein the thermistor is glued to the protective cover.

3. The cable connector assembly as claimed in claim 1, wherein the protective cover prevents molding material of the insulative inner cover from embedding the thermistor.

4. The cable connector assembly as claimed in claim 1, wherein the protective cover has a fence and a top wall.

5. The cable connector assembly as claimed in claim 1, wherein the protective cover has a fence and an open top, the fence being close to or in contact with the metal shell.

6. A method of making a cable connector assembly, comprising the steps of:
    affixing a thermistor to a protective cover;
    mounting the protective cover and the thermistor on a printed circuit board (PCB);
    connecting a mating unit and a cable to two opposite ends of the PCB;
    enclosing a metal shell around the PCB, a rear of the mating unit, and a front of the cable; and
    over-molding the PCB, the metal shell, the rear of the mating unit, and the front of the cable; wherein
    the thermistor is installed in series with a circuit and used to protect against overcurrent conditions; the thermistor is adhered to the protective cover, thereby permitting any expansion of the thermistor; wherein
    the metal shell includes a first shell part and a second shell part fastened together; the first shell part and the second shell parts include main portions having extended arms to wrap around the mating unit, side portions cooperating with the main portions to surround the PCB, and linking portions extending from the corresponding side portions or main portions to fastening portions crimping the cable.

7. The method as claimed in claim 6, wherein the over-molding step comprises molding an insulative inner cover over the PCB, the metal shell, the rear of the mating unit, and the front of the cable and molding an insulative outer cover over the insulative inner cover.

8. A cable connector assembly comprising:
    a mating unit;
    a cable;
    a printed circuit board (PCB) interconnected between the mating unit and the cable;
    a protective cover and a thermistor enclosed within the protective cover with an elastic material therebetween as an interface so as to allow lateral expansion of the thermistor even if the thermistor is associated with the protective cover and securely mounted upon the printed circuit board, the protective cover being intimately seated on the PCB;
    an insulative inner cover over-molding the PCB, the rear of the mating unit, and the front of the cable; and
    an insulative outer cover over-molding the insulative inner cover wherein
    the thermistor is installed in series with a circuit and used to protect against overcurrent conditions; the thermistor is adhered to the protective cover, thereby permitting any expansion of the thermistor; wherein
    the metal shell includes a first shell part and a second shell part fastened together; the first shell part and the second shell parts include main portions having extended arms to wrap around the mating unit, side portions cooperating with the main portions to surround the PCB, and at least one linking portion extending from the corresponding side portion or main portion to a fastening portion crimping the cable.

9. The cable connector assembly as claimed in claim 8, wherein the thermistor is glued to the protective cover.

10. The cable connector assembly as claimed in claim 8, wherein the protective cover prevents molding material of the insulative inner cover from embedding the thermistor.

11. The cable connector assembly as claimed in claim 8, wherein the protective cover has a fence and a top wall.

12. The cable connector assembly as claimed in claim 8, further including a metal shell enclosing the printed circuit board and the protective cover, wherein the protective cover has a fence and an open top, the fence being close to or in contact with the metal shell.

13. The cable connector assembly as claimed in claim 8, wherein the protective cover includes a fence surrounding the thermistor, and said fence forms a chamfer to receive the elastic material around the printed circuit board.

14. The cable connector assembly as claimed in claim 8, further including a metal shell enclosing the printed circuit board and the protective cover, wherein the protective cover has a fence and a top wall commonly cooperating with the printed circuit board to fully surround the thermistor, and the insulative inner cover fills space among the metal shell, the protective cover and the printed circuit board.

* * * * *